Dec. 24, 1968   F. E. BROWN   3,417,899
TUBE CLOSURE
Filed May 9, 1967   3 Sheets-Sheet 1
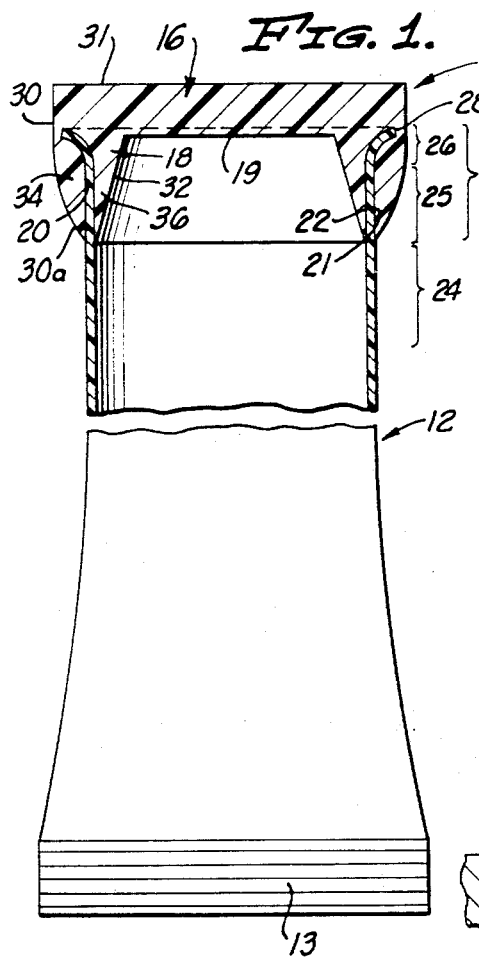
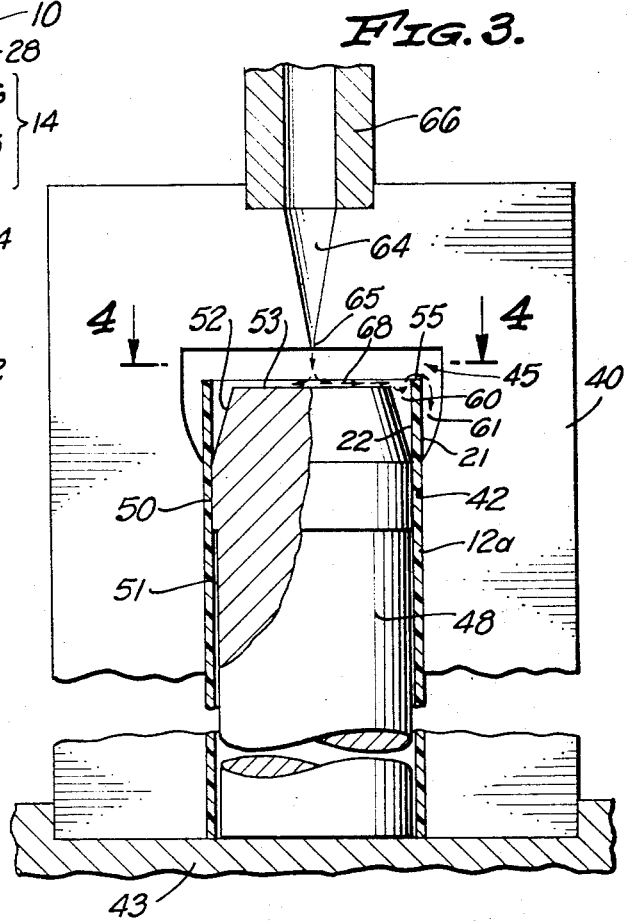
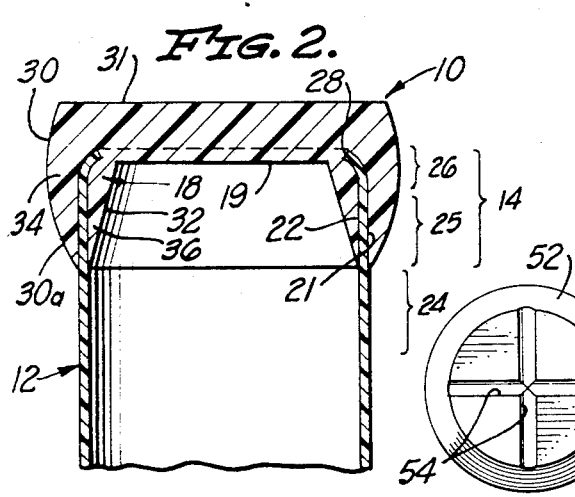
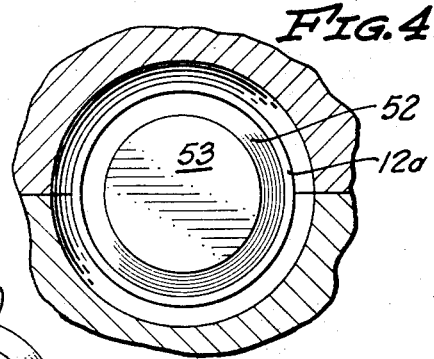
INVENTOR.
FRANK E. BROWN
BY HIS ATTORNEYS
HARRIS, KIECH, RUSSELL & KERN Dec. 24, 1968     F. E. BROWN     3,417,899

TUBE CLOSURE

Filed May 9, 1967     3 Sheets-Sheet 2

INVENTOR.
FRANK E. BROWN
BY HIS ATTORNEYS
HARRIS, KIECH, RUSSELL & KERN

Dec. 24, 1968  F. E. BROWN  3,417,899
TUBE CLOSURE
Filed May 9, 1967  3 Sheets-Sheet 3
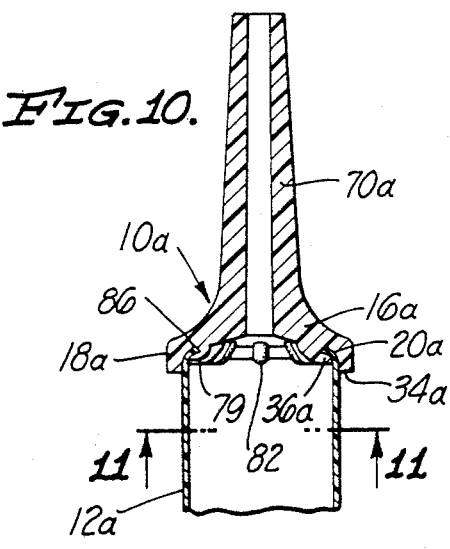
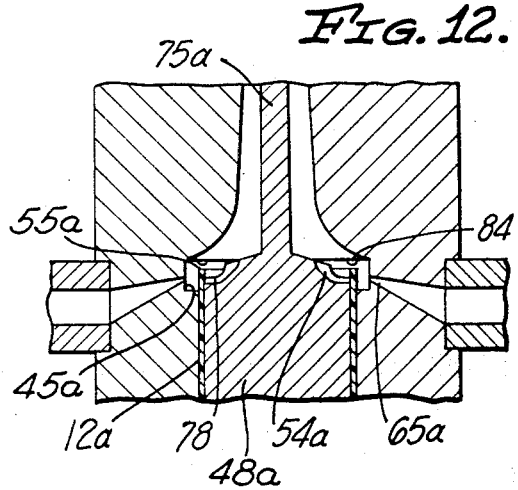
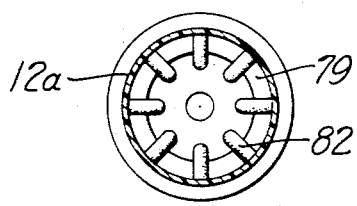
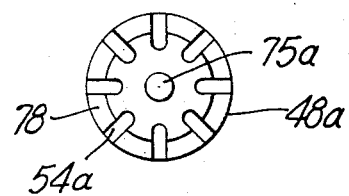
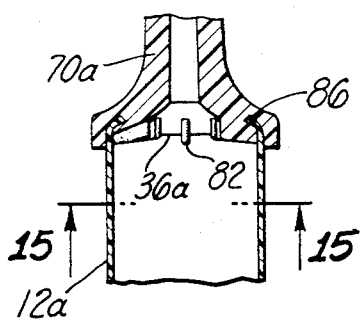
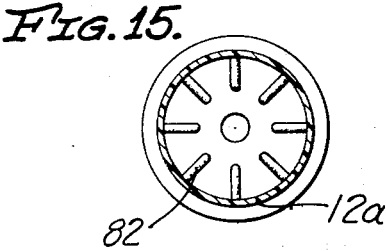
INVENTOR
FRANK E. BROWN
BY HIS ATTORNEYS
HARRIS, KIECH, RUSSELL & KERN

United States Patent Office 3,417,899
Patented Dec. 24, 1968

3,417,899
TUBE CLOSURE
Frank E. Brown, Glendale, Calif., assignor to Unette Corporation, Livingston, N.J., a corporation of Delaware
Continuation-in-part of application Ser. No. 366,495, May 11, 1964. This application May 9, 1967, Ser. No. 643,000
15 Claims. (Cl. 220—67)

ABSTRACT OF THE DISCLOSURE

A head of plastic is injection molded on the end portion of a tube of the same or a dissimilar plastic in such way that there is no significant fusion of the plastic, but the head resists pull-out of the tube end up to the tensile strength of the tube or a value only slightly less. The end portion of the tube is curved inwardly or outwardly by the heat and flow of the injected plastic that solidifies with the curved end portion within the confines of the head, so that the curved end portion is in a curved groove of the head from which it cannot be withdrawn without overcoming the frictional retention and without significant change in shape of the groove and/or the embedded end portion, resisted by the plastic of the head and the tube.

Disclosure

This application is a continuation in part of my application of the same title, Ser. No. 366,495, filed May 11, 1964, now abandoned.

My invention relates to tube closures and more particularly to a head or closure for tubes made of plastic; also to method steps employed to form the head and unify it with an end portion of the tube.

The term "tube" is used in a broad sense and includes a tubular extension that is often employed to form a neck of a larger container such as a bottle made of plastic. The invention will be exemplified in conjunction with long and slender squeezable tubes used to market and dispense various liquid or semi-liquid products.

In prior practice it has been proposed to apply a premolded head or closure made of plastic to the end of a tube made of similar plastic and heat-seal or adhere the elements together by an adhesive. Alternatively it has been proposed to injection-mold a head or closure made of plastic on a pre-cut length of tubing made of the same plastic, allowing the molten plastic to fuse or bond unitarily or molecularly to the plastic of the tubing in a ring-like area within the end of the tube. Both procedures require the use in both elements of compatible plastics that will bond or fuse together by heat or that can be attached by adhesives. Dissimilar plastics that are incapable of significantly fusing cannot be used. Correspondingly, only a limited number of plastics have been usable in such prior practices.

The present invention makes it possible to injection mold a head on a tube end of the same or a dissimilar plastic in such a way that there is no significant fusion of the plastics where they contact, all without the use of adhesives or a solvent for the plastic or plastics used. The joint of the invention resists pull-out of the tube end up to or nearly to the tensile strength of the adjacent unembedded body portion of the tube even though the tight permanent junctions of the invention are largely the result of mechanical or clamp-type forces as compared with the molecular or integral bonds previously proposed. This is a surprising result keeping in mind that the plastics used for the tube and the head are slick-surface resilient plastics as later mentioned.

It is a characteristic of the invention that a cantilevered end of the tube is injection bent during the injection of the plastic of the head into the molding cavity and as a result of heat and flow of the entering plastic. The plastic hardens or sets while the tube end remains bent. The bending can be either inward or outward relative to the longitudinal axis of the tube. These bent portions are sometimes hereinafter referred as radially bent portions, it being understood that "bent" as used herein has reference either to an outward or inward bend in the tube end or to an outward or inward curvature thereof.

In the resulting product the radially bent end of the tube is locked in a correspondingly curved groove or passage of the head, from which it cannot be withdrawn except by overcoming significant frictional forces and, importantly, without significant change in shape of the passage and/or the embedded end portion of the tube. Withdrawal is resisted by the fact that the plastic of the head and the tube resist such change in shape. In the preferred embodiments the head resists pull-out of the tube end up to the tensile strength of the tube or a value only slightly less. If destructive internal pressures are imposed on a plastic tube closed by the joint of the invention the tube will fail before the joint leaks or fails. General objects of the invention reside in the provision of such a joint as previously described and a simple and inexpensive method of forming it during the injection molding of a head or closure on the tube.

Specifically, it is an object of the invention to provide a tube closure or head that is locked or anchored to the tube end by mechanical forces, as distinct from being significantly fused to the plastic of the tube; also to provide an all-plastic joint in which the tube end is curved within the head and lies entirely within the confines thereof, any attempts to pull the tube end from the head requiring change in shape of the curved portion of the tube end or the curved passage embracing it, thus setting up forces within the head and the embedded tube end induced by the pull-out attempt and resisting same.

It is also an object to provide a novel method of molding a closure or head on a tube end in such way as to obtain a tight junction by mechanical forces or by a mechanical bond which acts as the exclusive connection or anchor as between the elements or which supplements any other adhesive force tending to hold the closure and the tube materials together.

An important object of the invention is to employ either, and preferably both, of two clamping actions to hold the tube and its closure together.

The first clamping action resisting separation of the elements is developed by curving the tube end and terminating it within the material of the closure as mentioned above.

The second clamping action resisting separation of the elements is developed by a shrinkage of one of the elements relative to the other during the hardening and subsequent aging of the material of the closure. In this connection it is an object of the invention to mold a closure on a tube end in such manner and with such relation of the materials of the two elements that one tightly grips the other with a high net gripping force resisting pulling the elements apart; also to provide a tube-closure combination in which the materials of the two elements are related in character, material and size as to grip each other tightly by contraction of one element on the other.

Further objects of the invention reside in the novel molding apparatus and methods by which a closure o one plastic can be molded on the end of a tube made o another plastic.

Other objects and advantages of the invention will be evident to those skilled in the art from the following description of exemplary embodiments.

Referring to the drawings:

FIG. 1 illustrates one embodiment of the invention with the closure and a portion of the tube shown in section;

FIG. 2 is a similar view illustrating an alternative embodiment of the invention;

FIGS. 3–6 illustrate apparatus useful in producing the embodiment of FIG. 1, FIG. 3 showing the initial arrangement of elements in the molding die, FIG. 4 being a section taken along a line 4—4 of FIG. 3, FIG. 5 being similar to FIG. 4 showing an alternative end face for the core body of FIG. 6 illustrating the elements upon completion of the molding operation;

FIGS. 10 and 11 are respective longitudinal and transverse sectional views of a further embodiment while FIG. 12 illustrates the mold in which it can be made, shown before the plastic is injected, and FIG. 13 is a top view of the core member used therewith; and FIGS. 14 and 15 are respective longitudinal and transverse sectional views of still a further embodiment.

Figure 6:
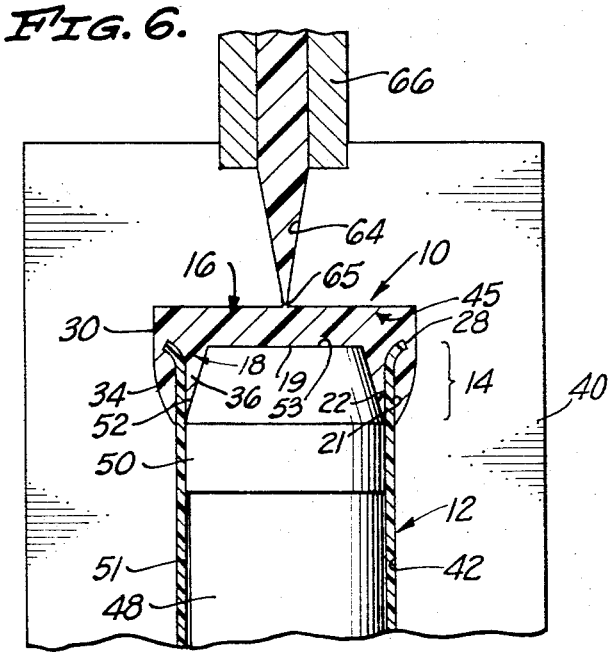

The invention is capable of use employing similar or dissimilar plastics for the tube and the head or closure. For either purpose slick-surface resilient plastics having substantial rigidity and thus resistant to change in shape are preferred, as distinct from extremely soft head plastics offering little resistance to change in shape; also as distinct from extremely rigid plastics such as styrene, Bakelite, etc. which if used as the tube material would not produce a tube that is squeezable to dispense its contents. The preferred slick-surface resilient plastics are thermoplastic polymers, e.g. any of the linear or regular (high density) or general purpose polyethylenes, polypropylene or polyvinylchloride, sometimes hereinafter referred to as lower melting point plastics, or high melting point materials such as fluorocarbon materials, e.g. trifluorochloroethylene ("Kel-F" made by Minnesota Mining & Manufacturing Co.), "Genetron" or "Acralar" (made by General Chemical Company), "Saran" (made by Dow Chemical Corporation), "Mylar," etc. By reference to any of such materials in the claims I include also equivalents or resilient plastics of similar surface properties. Illustrative of the wide differences in melting point between the plastics that can be employed in the invention, "Kel-F" melts at about 550° F. and cannot be significantly bonded to high-density polyethylene (M.P. about 400° F.), linear polyethylene (M.P. about 400° F.), general-purpose polyethylene (M.P. about 275–300° F.) or polypropylene (M.P. about 320° F.).

When dissimilar plastics are used the tube should preferably be made of the plastic that is least porous to vapors, e.g. trifluorochloroethylene, "Genetron," "Acralar," "Saran," "Mylar," or polyvinylchloride, using a polyethylene or polypropylene for the head or closure. Escape of vapors from essential oils through the tube can thus be substantially eliminated and the thicker mass of the head or closure substantially eliminate escape of such vapors through the more pervious plastic thereof. With such more pervious plastics used for the tube, as has been required by the prior processes mentioned above, the scent, taste and/or character of the products marketed therein will change materially during shelf storage. The invention makes it possible to apply closures or heads of cheap conventional plastics to thin tubes made of one of the more exotic plastics, the tubes being soft and squeezable yet impervious to vapors.

FIG. 1 illustrates in general a head or closure 10 molded on the end of a tube 12 the lower or far end of which is subsequently flattened and heat-sealed as indicated at 13 after filling of the container formed by the tube 12 and its closure. The flat closure 10 may form the only element closing the upper end of the tube 12, as in FIG. 1, in which event expulsion of the product can be effected by piercing the closure and squeezing the tube in well-known manner. Alternatively the closure 10 may be apertured and shaped to accommodate any well known threaded or slide-type cap as in the embodiments of the invention shown in FIGS. 8 and 9.

The closure 10 is molded on an end portion 14 of the tube 12 and comprises a closure wall 16 at least partially closing such end portion. The closure 10 includes also an annular neck 18 integral with the closure wall 16 and depending from a lower surface or inner face 19 thereof. The annular neck 18 provides an annular groove or passage 20 in which the end portion 14 of the tube 12 is pressurally anchored.

The annular neck 18 of the closure is molded around the end portion 14, the outer and inner faces 21 and 22 of the end portion forming outer and inner molding faces 21 and 22 respectively determining the shape of the outer and inner walls of the annular groove 20. Best anchoring of the tube and the closure will be effected by curving a section of the embedded end portion 14 during the injection molding of the closure. As illustrated, that portion of the tube 12 near the closure 10 is made up of an exposed body section 24 immediately adjacent or below the annular neck 18, an intermediate or embedded end section 25 of the same diameter as the section 24, and a curved annular end section 26 terminating in an extreme annular end illustrated as an annular lip 28 which is preferably near the plane of the inner face 19 but may be slightly above or slightly below this face. The curved annular end section 26 may curve outward as in FIG. 1 or may curve inward as in FIG. 2. In either event the annular lip 28 should terminate within the confines of the closure 10, leaving some portion of the plastic thereof between this annular lip and the exterior and interior surfaces of the closure. In the embodiments of FIGS. 1 and 2 the exterior surface is indicated by the numeral 30 and is of larger diameter than the annular lip 28. It extends downward from an upper face 31 of the closure wall 16 with its upper portion concentric with the axis of the body section 24 and its lower section 30a tapering inward toward the outer periphery of the tube 12. The interior surface 32 of the annular neck 18 is exemplified as frusto-conical in the embodiments of FIGS. 1 and 2 and flares outwardly and downwardly from the inner face 19 to the inner surface of the tube 12.

The plastic of the closure 10 provides an outer ring 34 of such plastic around and embracing the end portion 14 of the tube and an inner ring 36 of such plastic within the end portion 14. It is an important feature of the invention that the cross-section of the outer ring 34 should be greater than the cross-section of the inner ring throughout most of the length of the embraced end portion 14. This is particularly true if the embedded end portion 14 is only slightly curved in its end section 26. In this respect the mass of the plastic in the outer ring should be significantly greater than the mass in the inner ring measured between planes transverse to the axis of the tube and spaced from each other a distance more than half the axial length of the embraced end portion. The reasons for these relationships will be discussed hereinafter.

In the exemplified embodiment the curve of the annular end section 26 is formed during the molding operation. FIGS. 3–6 illustrate a molding apparatus and a molding sequence by which this can be accomplished in the production of the embodiment of FIG. 1.

Referring particularly to FIG. 3 the closure 10 is molded in a split die 40 having mating die elements engaging in the plane of the paper and suitably aligned by conventional means. The die provides a longitudinal passage 42 that may be closed at one end by any suitable die member 43 forming a part of the injection molding apparatus, the passage opening at its other end on a molding cavity 45 having walls conforming to the desired shape of the closure 10. The longitudinal passage 42 is of a diameter substantially equal to the external diameter of the length of tubing 12a that is to form the tube 12 and that is preferably a cut length of extruded tubing. The word "diameter" as herein used in a generic sense as a measure of radial distances irrespective of equality of all diametrical dimensions in a plane transverse to the axis of the tube or any passage or element of the die. The longitudinal passage 42 is usually cylindrical and thus of circular cross section but it may be of elliptical or other shape in cross section.

The length of tubing 12a is made to surround a core element or member 48 of a cross-sectional shape corresponding to the passage 42. This core member may be a part of the molding equipment or a separate element around which the tubing is slipped before it and the core member are placed in the die. Alternatively the length of tubing 12a may be first inserted into the passage, before or after it has been severed from a roll or length of the tubing, and the core member 48 then inserted into the length of tubing and the die. In either event care should be exercised to have the forward ends of the two elements in proper relation to each other and to the end wall of the molding cavity 45, as will be described.

The core member 48 includes a sealing portion formed by a contact ring 50 having an exterior surface that is substantially the same diameter as the internal diameter of the tubing. Below the contact ring 50 the core member 48 is desirably relieved to form a passage 51 between the inner wall of the tubing and the exterior surface of the core member which passage may extend to the die member 43. Above the contact ring 50 the core member 48 provides a converging molding face 52 and an end molding face 53 bounding the molding cavity 45 and respectively determining the shape of the interior surface 32 and the inner face 19 of the closure. The end molding face 53 may be flat, as suggested in FIGS. 3 and 4, or it may be a flat or curved surface with two or more shallow radial grooves 54 (FIG. 5) extending centrally outward to the periphery thereof to guide the entering plastic material introduced into the molding cavity or to mold internal ribs in the inner face 19 of the closure, as will be described.

In the ultimate in-die position the tubing and the core member are oriented so that an end portion of the tubing extends in cantilever fashion in the molding cavity. Its extreme end 55 can be slightly above or beyond the end face 53 of the core member 48 as shown in FIG. 3 or it may be opposite this face. In other instances it is often preferable to dispose the end 55 somewhat below or short of the face 53. In all instances the end section 26 (FIG. 1) will be curved during the molding operation to be described. The only thing critical is that the end 55 when deformed should not engage or abut the outer wall of the molding cavity or any other wall thereof, thus insuring that the resulting annular lip 28 of FIG. 1 shall be within the confines of the closure 10 and terminate within the plastic thereof.

During the closing of the die 40 that portion of the tubing around the contact ring 50 is compressed tightly between the ring and the walls of the longitudinal passage 42, forming a seal preventing egress of molding material from the molding cavity 45. The sealing action is preferably such as to permit the exhaust of air from the molding cavity through the sealing zone along the inner and outer surfaces of the tubing in a direction toward the die member 43. A significant compression of the wall of the tubing in the sealing zone around the contact ring 50 will provide a seal selectively exhausting air but holding back the plastic.

With the tube end thus oriented there will be in the molding cavity 45 an inner zone 60 between the inner molding face 22 of the tubing and the face 52 of the core member; also an outer zone 61 between the outer molding face 21 of the tubing and the outermost wall of the molding cavity. These zones 60 and 61 communicate with each other beyond the extreme end 55 of the tubing. In the preferred practice of the invention the plastic that is to form the closure 10 is injected into the molding cavity in such way as to cause this plastic to flow first into one of such zones and then into the other thereof. By so doing it has been found that the end of the tubing can be curved during the molding operation either outward as in FIG. 1 or inward as in FIG. 2, depending upon whether the inner molding face 22 or the outer molding face 21 is first contacted by the incoming plastic material. The injection means of FIG. 3 will cause an outward curve of the tube end.

In FIG. 3 the die 40 provides for injection of the plastic material through a tapered runner 64 terminating in a pinpoint gate 65 directed toward the center of the interface 19. The hot plastic material for the closure 10 is forced through the gate 65 under high pressure from the usual nozzle 66 of the injection machine. The jet from the gate 65 impinges on the end molding face 53 and spreads as a radial stream clinging thereto as shown by the arrows 68. At the shoulder, formed by the junction of the molding faces 52 and 53, this stream tends to cling to such surfaces and be deflected downward into the inner zone 60 to contact the inner molding face 22 at high velocity at a position below the end 55 before flowing over this end into the outer zone 61 where it contacts the outer molding face 21. The arrows 68 suggest this flow pattern but it should be understood that the degree to which the plastic material dips in the inner zone 60 need not be as extreme as shown. Regardless of the degree of dipping, the plastic first contacts the inner molding face 22 of the tubing in this embodiment, heats it and exerts a displacing effect thereon before entering the outer zone 61 to contact the outer molding face 21. This action can be made to soften and curve the end section of the tubing to the extent indicated in FIG. 1 or to a lesser extent if the latter is desired. The curvature will remain during the time the plastic material is hardened in the die. The curving of a plastic tubing under these conditions is unexpected and the reasons therefor are not fully understood. The clinging of the plastic to the surfaces of the core member 48 is undoubtedly a significant factor in forming the curve because even if the end 55 is significantly below the end face 53 an outward curving will still result. Likewise the rapid flow of the material into contact with the inner molding face 22 is of importance.

The curving of the tube end will take place whether the face 53 is flat or slightly curved and whether or not the radial grooves 54 of FIG. 5 are formed therein. In the latter instance the flow will tend to concentrate at the zones of these grooves and there may be a somewhat greater curving of the tube end in areas opposite these grooves than in intervening areas, producing an ultimate annular lip 28 that undulates both laterally and in an axial direction with the undulations occurring at the groove positions. It should be understood that it is not essential that the annular lip 28 be strictly circular, oval or of regular geometrical configuration as undulations therein are not detrimental and often desirable. As a matter of fact it is sometimes preferable to serrate the end 55 of the tubing as distinct from cutting it straight as in FIG. 3 thus creating or accentuating undulation. Indeed if the tube is cut from a roll or length of tubing by flattening it between cutting edges that are not serrated the resulting end 55 will not have all surface portions lying in a single radial plane and some undulation of the annular lip 28 may occur for this reason.

Figure 7:
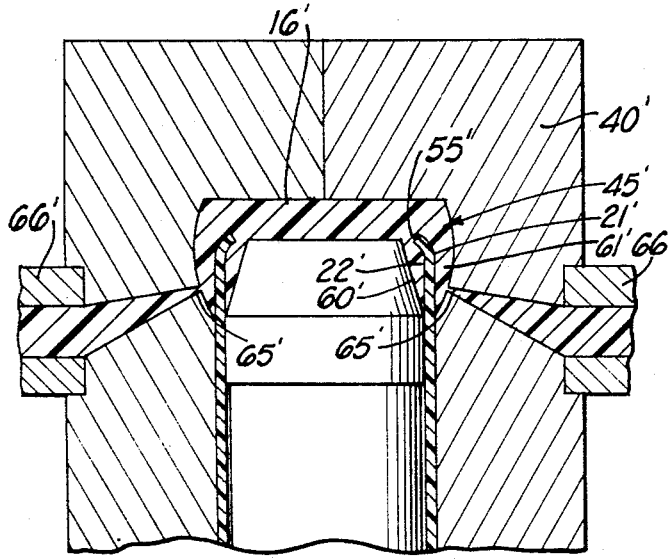
FIG. 7 is a view similar to FIG. 6 showing an apparatus for making the embodiment of FIG. 2.

If the end of the tube is to be curved inwardly toward the axis, as in FIG. 2, the molding equipment of FIG. 7 can be employed, corresponding parts being indicated by primed numerals as compared with FIGS. 1 and 3. Here the incoming plastic is introduced into the molding cavity 45' of the dies 40' in such way as to engage first the outer molding face 21' and later the inner molding face 22'. This may be accomplished by injecting the plastic radially or tangentially into the outer zone 61' before it flows into the inner zone 60', as by employing two or more pinpoint or horizontally elongated gates 65' or an essentially annular gate opening on the outer zone. The incoming plastic engages the outer molding face 21' with substantial velocity and to some extent sequentially fills the outer zone 61', that zone of the molding cavity forming the closure wall 16', and the inner zone 60'. As before the flow softens and deforms the end of the tubing by a combination of heat and flow forces, the inward deformation remaining during the hardening of the plastic in the molding cavity.

It has been unexpectedly found that with appropriate plastics and injection temperatures a small bead, illustrated in FIGS. 10 and 14 to be later described, can be formed from the tube plastic adjacent the extreme end 55 or 55'. This bead on the ultimate annular lip 28 may be continuous therearound or may be more pronounced in some peripheral sections, often in sections between the grooves 54 if such grooves are used. The bead is of a thickness greater than that of the curved annular section therebeneath and acts further to anchor the tube end in the closure. It is believed that three factors lead to the formation of such a bead. First, the extreme end of the tube becomes heated because the incoming plastic transfers heat thereto on three sides as it flows therearound, namely at the outer portions of the outer and inner surfaces 21, 22 and the bridging surface at the extreme end 55 or 55'. Second, the extreme end of the tube is remote from the tube-holding die elements adjacent the contact ring 50 which die elements act as a heat sink to remove heat more rapidly from the lower portion of the bent section of the tube than the upper extreme end thereof. Third, the ultimate high pressure in the molding cavity 45, 45' is substantially equally and oppositely applied to the substantially parallel surfaces 21, 22 but is applied directly to the end 55 or 55' causing the latter to be displaced a minute distance lengthwise of the curved portion toward the base of the latter. This may explain why the bead often has relatively sharp corners as distinct from being more doughnut shape.

Figure 8:
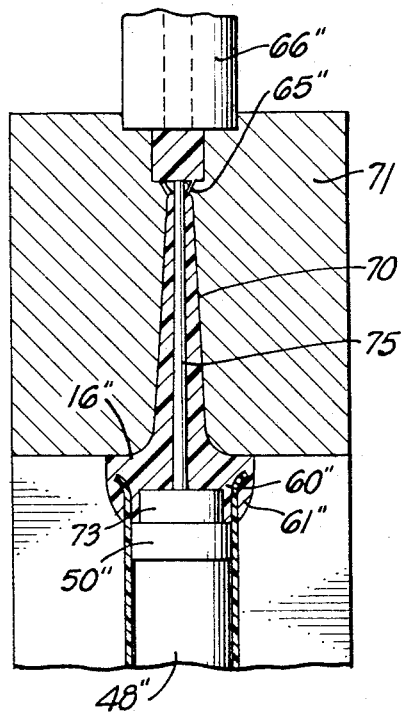
FIG. 8 illustrates an alternative embodiment of the invention and apparatus for making same.
Figure 9:
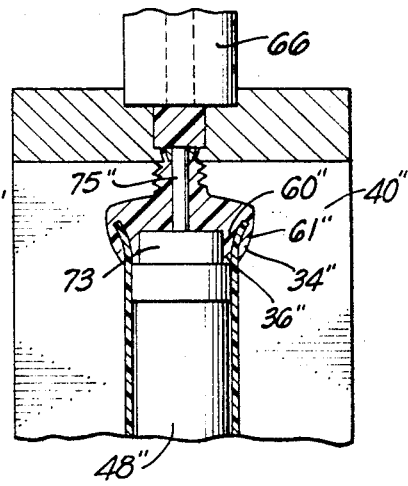
FIG. 9 illustrates a further embodiment of the invention and apparatus by which it can be formed.

FIGS. 8 and 9 illustrate how closures of other shape can be molded on the end of a tube while curving the end thereof outwardly according to the principles of FIGS. 1, 3 and 6. In FIG. 8 the mold is designed to produce a nozzle 70 on the closure wall 16''. Here the upper boundary of the molding cavity is formed by a die member 71 having a tapered mold passage corresponding to the desired shape of the nozzle 70 and providing one or more pinpoint gates 65'' which discharge the plastic into the end of the mold passage to flow downward or inward therein. The lower end of the mold passage opens on the inner zone 60'' and supplies plastic thereto before the same fills the outer zone 61'' to effect the aforesaid curving of the tube end. The inner end of the core member 48'' here provides a neck 73 of somewhat smaller diameter than the contact ring 50'', a construction which can also be used in the molding equipment of FIGS. 3 and 7 if the interior surface 32 of the closure 10 of FIG. 1 is to be of corresponding shape. A core pin 75 protrudes from the neck 73 and molds a longitudinal passage in the nozzle 70 through which the product may be later dispensed upon squeezing the tube.

The die of FIG. 9 is similar to that of FIG. 8 but is designed to mold a closure having a threaded neck for receipt of a cap. The elements of the die 40'' here provide thread spaces. As in FIG. 8, a neck 73 is formed at the end of the core member 48'' and a core pin 75'' protrudes therefrom to form the passage through the closure. As in FIG. 8, the incoming plastic first contacts the inner surface of the tube end and causes the outward curving previously mentioned. In both FIGS. 8 and 9 it is best, as in FIGS. 1 and 2, that the mass or cross section of the molded material filling the outer zone 61'' should be larger than in the inner zone 60'' so that the corresponding outer and inner rings 34'' and 36'' will also be of correspondingly different cross section and mass.

FIGS. 10–15 show the invention as applied to the making of a rectal-type device similar to that formed in FIG. 8 but with the tube end being curved inwardly in a way to minimize the amount of plastic needed to form the closure or head. Parts corresponding to those of the previously described embodiments are indicated by corresponding numerals with the suffix a. The mold of FIG. 12 is essentially the same as that of FIG. 8 but adapted to produce an inward curving of the tube end and adapted to form a nozzle 70a (FIG. 10) that is molded around a later-withdrawn core pin 75a. Gating can be as described with reference to FIG. 7 and supplies the plastic for the complete closure, including the nozzle 70a.

The core member 48a (FIGS. 12 and 13) has grooves 54a which terminate inwardly a slight distance from the core pin 75a. An annular offset 78 is adapted to mold an annular ring 79 immediately inside the tube end but the grooves 54a are deeper than the height of the annular ring 79 to produce ribs 82 (FIG. 11) that extend outward and are preferably radial and that provide outer ends that are a part of or integral with the inner ring 36a, the remainder of this inner ring 36a functioning similarly to the inner ring 36 previously described constituting shallow sections between the ribs 82 and here formed in part by the annular ring 79. FIGS. 14 and 15 show a slightly different embodiment without the annular ring 79 and with somewhat deeper ribs. There is still a significant inner ring 36a even between the ribs 82 which while not as high as in the embodiments of FIGS. 1–9 serves with the rib ends the same purposes as described.

FIG. 12 shows the relationship of parts in the mold preparatory to injection. To insure that the extreme end 55a of the length of tubing 12a will not engage the end wall of the die space 45a if the tubing is first inserted and the core member 48a subsequently inserted, several projections 84 can optionally be provided as stops or a vacuum type or mechanical clamping means can be used during insertion of the core member 48a to prevent any inward shifting of the length of tubing. The tube end is curved inward by the plastic entering under high pressure through the gates 65a of FIG. 12 as previously described. If the projections 84 are used the entering plastic will bend the tube end inwardly therebeyond and will hold this bend during the time that the nozzle-forming space and the inner zone within the cantilevered tube end, including the groove 54a, are filling.

The aforesaid bead that forms at the ultimate annular lip is shown at 86 in FIGS. 10 and 14. Similar beads can be formed on the earlier-described embodiments by selection of proper plastics and injection temperatures. Such beads are more easily formed when both the tube and the head are of polyethylene or polypropylene or other relatively soft plastics. They are formed only on thermoplastic tubes and when the temperature of the injected plastic is high enough to soften and locally compact the tube end. It is more difficult to form such beads 86 on the ends of tubes made of high-melting-point plastics such as Kel-F but this can usually be accomplished by using a similar plastic for the closure injected under sufficiently high temperature to soften and locally compact the tube end.

The following examples further explain the invention and its advantages.

As an example of the FIG. 1 embodiment employing a tube of one of the more exotic plastics closed by a polyethylene head, the tube was made of Kel-F having an external diameter of ½" and wall thickness of about .006 inch. A length of this tubing was slipped over the core member 48 with the end 55 thereof substantially opposite the face 53. The tube and core member were then placed in the die 40 which was at room temperature. Polyethylene was then rapidly injected at high temperature into the molding cavity 45 through the pinpoint gate 65 under high pressure until the cavity was filled, any entrapped air escaping from the cavity in the zone of the contact ring 50. The temperature of the influent polyethylene can be in the range of about 250–400° F., depending on the density of the material being molded. During inflow, the hot plastic first impinged on and flowed radially outward along the end molding face 53 of the core member 48, then entering the inner zone 60 and impinging on the inner molding face 22 at some position between the end 55 and the contact ring 50. This and the subsequent flow across the tube end 55 into the outer zone 61 produced the curve in the curved annular end section 26.

The high temperature of the inflowing material softens the end of the tube which then curves as a result of the softening, the sequential filling of the inner and outer zones 60 and 61 and the velocity of the material imparted by its rapid injection. The amount of curving of the end section 26 will depend upon several factors including the height of the end portion 14 beyond the contact ring 50, the rigidity of the material of the tube, the degree of softening of the tube material and the rate at which the polyethylene is injected into the molding cavity. This injection rate may be of the order of that used in conventional injection molding machines. The molding cavity 45 fills very rapidly and the material is held therein under pressure for a time sufficient to harden the polyethylene. The die can then be opened and the tube and its closure permitted to cool further.

Preheating of the die is neither necessary nor desirable. When the die is used in production molding it is desirable to cool it by water or air to maintain it at a temperature at or slightly above room temperature, e.g. in the neighborhood of 100° F. depending on the complexity of the part being molded. The high temperature of the influent plastic is relied upon to soften the material of the tube end if curving thereof is desired.

It is distinctly preferable to age the polyethylene or other plastic of the closure before attempting to pull the closure from the tube in testing the strength of the resulting joint. In many instances it has been found that if a large force is applied to the closure immediately after the tube has been removed from the die but after cooling to atmospheric temperature the closure can be pulled from the tube. However identical specimens show that the force necessary to pull the closure from the tube end increases with aging of the plastic of the closure. After the tube and its closure have been aged for a number of hours, e.g. 24–36 hours, it is usually impossible to pull the closure from the tube by forces applied axially of the tube up to the elastic limit thereof. In other words the forces holding the closure and the tube together become such that the tube will rupture in tension rather than pulling from the closure.

An important factor in obtaining this result is the increased cross section or mass of the outer ring 34 as compared with the inner ring 36. A polymer will shrink during the aging period and during which time the material reaches equilibrium. The material of the outer ring 34 shrinks tightly about and embraces the outer molding face 21 with increased pressure during the aging. The plastic of the tube is relatively strong in compression and with all of its peripheral portions confined in the annular groove 20 a considerable radial pressure results from shrinkage of the outer ring 34 on the outer molding face 21 of the tube. The material of the inner ring 36 may tend to shrink away from the inner molding face 22 of the tube material during such aging but the larger mass of the outer ring 34 greatly overbalances any decrease in outward pressure on the inner face 22 from shrinkage of the inner ring. After aging, closures having outer rings 34 of larger mass or cross section than their inner rings 36 will be substantially stronger against pull-off as compared with closures in which the rings are of the same cross section or closures in which the inner ring 36 is of a cross section or mass larger than the outer ring 34.

Aging of the polymer is best effected by avoiding any deliberately fast chilling after withdrawal from the mold although such a procedure can be used if desired. Best results are obtained if the tube and closure are cooled gradually to atmospheric temperature and permitted to age at such temperature for a number of hours.

The curved-end embodiments of the invention develop additional forces, supplementing the clamping action discussed above, that resist pulling of the closure from the tube. These result from the curving of the annular end section 26. To pull the tube from the closure the curved portion must deform in radial dimension to follow the contour of the annular groove 20. At room temperature plastic materials like Kel-F or other appropriate tube plastics strongly resist such deformation. For example with the outward curve of FIG. 1 the material in the curved portion must deform inwardly to reach the straight portion of the annular groove 20, resulting in strong circumferential compression of the tube material in this curved portion thereof. It is difficult thus to circumferentially compress the confined tube material, with the result that pull-apart pressure required to remove the closure from the tube end is substantially increased as the result of the curvature of the tube end. The mechanical anchoring of the tube can be further increased by initially roughening the molding faces 21 and/or 22 by etching or sandblasting so that the plastic of the closure enters the resulting surface irregularities. In all instances it is desirable that the molding faces 21 and 22 be clean at the time the closure is molded on the tube. All of the above principles, exemplified as concerns the FIG. 1 embodiment, are also applicable to the other embodiments shown.

It will be apparent that the invention is not limited to closures of the particular shape herein exemplified except as this shape may control the relative sizes of the outer and inner rings 34 and 36. Usually the closure will be somewhat larger in external diameter than the tube. Its internal shape can be varied widely but both internal and external shapes should be such that the annular lip 28 terminates within the confines of the closure.

Within the above limitations various elements can be molded as a part of the closure, depending on the use or dispensing purpose desired. For example the nozzle 70 of FIG. 8 may be designed as a rectal tip, an applicator with or without an enlarged head, a tip for irrigation of the ear, etc. or there can be molded integrally with the closure a threaded cap-receiving extension (FIG. 9) useful in packaging toothpaste, creams, etc. In other instances items like spoons, troughs, etc. can be molded as part of the closure as will be evident to those skilled in the art.

The above principles, exemplified as concerns the FIG. 1 embodiment are applicable to the other embodiments and also to the forming of heads on tubes of the same plastic. In the latter instance the pull-apart strength of the joint is sometimes slightly less than the tensile strength of the tube as exemplified by the following steps in the making and testing of the ribbed embodiments of FIGS. 10 and 14 employing a die that was oval-shaped in cross-section.

The tube was a length of polyethylene (Alathon 20) cut to a length of 4" from a roll of tubing and was deformed to the oval shape of the die and inserted therein to a position shown in FIG. 12. The core member 48a was then inserted to the position shown, all while the die was cooled to or at a temperature of about 100–120° F., the head plastic (also Alathon 20) was injected under high pressure in an amorphous state and at a temperature of about 280° F. while the die temperature was maintained in the range of 100–120° F., producing the inward curving shown in FIGS. 10 and 14. The injection temperature for this material may be in the range of about 275–285° F. but the injection temperature is desirably somewhat lower than would be used conventionally in molding this material. It is desirable to inject the plastic at the lowest temperature that will place it in a flowable amorphous state and that will insure successful filling of the die cavities. Due to the low resistance to flow, the injection pressures can likewise be somewhat lower than would be commonly used in the nominal molding of the plastic employed. As a result of these effects, the tube end can be curved inward or outward and the resulting joint will show no significant fusion of the adjoining identical or similar plastics.

In all instances later tests of the joint formed by the engagement of the two polyethylenes and made as above showed no significant fusion or welding with no special treatment of the cantilevered end of the tube. Later pull-out tests of these tubes and closures thus produced showed the following.

In making pull-out tests the sample was placed in an oval collar that was anchored against movement with the collar surrounding the tube and bearing against the radial shoulder at the bottom of the head. The tube at its remote end was pressed together between jaws that could be pulled by a measured force that was increased until the tube or the joint failed. The tubing alone had a strength of 65 pounds in tensile pull, measured between jaw-clamped ends thereof. An average of ten pull-out tests showed failure at the joint at 55.5 pounds. Most of the tests showed a strength about 10% less than the tensile strength of the tube. The difference results from two factors. First, the plastic of the tube end is somewhat weaker as a result of having been heated and stressed during the bending. Second, the bending itself tends to thin the tube wall. It is to be noted however that the pull-apart strength is only slightly less than the tensile strength of the unembedded body portion of the tube. With other embodiments of the invention the strength of the joint can equal or exceed the tensile strength of the body portion of the tube.

To show that no significant welding occurs in the joints, samples were made up as above but the tube ends were coated with a liquid silicone before the head was molded thereon. Pull-apart tests with these samples showed an average strength of 55.3 pounds. This is only slightly less than with the untreated tube ends and can be accounted for by the lubricating action of the silicone. The silicone would of course prevent any surface or point fusion of the plastics.

I claim:

1. As an article of manufacture, a thin-walled tube of substantially uniform wall thickness formed of plastic having a body portion and an end portion, and a head formed of plastic of substantial rigidity injection molded on said end portion of said tube with the end of said tube completely imbedded in the head, characterized by the following features:

the head is of larger external diameter than the external diameter of the body portion of the tube at a position adjacent said end portion thereof;

said end portion comprises a first section of substantially uniform diameter and a second section that is radially bent to form a section of progressively changing diameter between an extreme annular end of such end portion and the junction of said first and second section of the end portion;

said second section of progressively changing diameter completely occupies a smoothly curving annular groove of the head extending from a lower plane at the junction of the first and second sections of the end portion to an upper plane within said head, the cross section of the annular groove in any radial plane smoothly curving in one direction only with reference to the axis of the tube to provide a smoothly curving groove progressively changing in diameter between said lower and upper planes with the diameter at said upper plane being significantly different from the diameter at said lower plane;

the extreme annular end of said end portion is within the confines of the head, as distinct from opening on any exposed external surface thereof; and the section of progressively changing diameter provides inner and outer surfaces of plastic frictionally engaging correspondingly curved plastic surfaces of said groove with no adhesive therebetween.

2. An article of manufacture as defined in claim 1 in which said second section progressively increases in diameter from said lower plane to said upper plane.

3. An article of manufacture as defined in claim 1 in which said second section progressively decreases in diameter from said lower plane to said upper plane.

4. An article of manufacture as defined in claim 1 in which said head provides outer and inner rings of the head plastic respectively outside and inside said radially bent second section of said end portion of said tube, said head providing an inner face facing the interior of said tube, said inner face having raised outwardly extending ribs with their outer ends extending to said inner ring.

5. An article of manufacture as defined in claim 1 in which the extreme annular end of said end portion of said tube is of undulating form.

6. An article of manufacture as defined in claim 1 in which the tube and the head are formed of the same plastic.

7. An article of manufacture as defined in claim 1 in which the tube and head are formed of different plastics incapable of fusing together throughout said frictionally engaging surfaces thereof when said head is injection molded on the end portion of said tube.

8. An article of manufacture as defined in claim 1 in which said head is a thick head formed of polyethylene or polypropylene, and in which said tube is a thin tube formed of a plastic that is more resistant to the transmission of vapors than the plastic of said head.

9. An article of manufacture as defined in claim 1 further characterized by the feature that the head provides an outer ring of the head plastic surrounding and pressurally engaging both the outer surface of said radially bent second section and the outer surface of said first section of substantially uniform diameter.

10. An article of manufacture as defined in claim 9 further characterized by the feature that the head provides also an inner ring of the head plastic within and contacting the inner surface of said radially bent second section and the inner surface of at least the upper portion of said first section of substantially uniform diameter.

11. An article of manufacture as defined in claim 10 in which the cross-section and mass of the plastic of the outer ring is significantly greater than the cross-section and mass of the plastic of said inner ring, and in which the second section of progressively changing diameter is anchored in said curving groove against pull-out by friction between engaging surfaces of said head and said end portion and also by the significant curvature of said second section and said groove because of which pull-out requires significant change in shape of at least one of the plastics of said second section and said head resisted by the strength and resistance to deformation thereof.

12. An article of manufacture as defined in claim 11 in which the pull-out force required to pull the end portion from the head is within about 10% of the tensile strength of the body portion of the tube.

13. An article of manufacture as defined in claim 1 including an annular bead on the extreme annular end of said end portion of said tube, said bead being formed of the tube plastic and completely occupying a corresponding annular enlargement of said groove, said enlargement being adjacent said upper plane.

14. An article of manufacture as defined in claim 13 in which said annular bead is of undulating form.

15. As an article of manufacture, a thin-walled tube with a head molded on an end portion of the tube, there being a joint holding the head on the end portion of the tube, characterized by the following features:

- both the tube and the head are formed of a slick-surface plastic having the surface characteristics possessed by plastics of the group comprising polyethylene, polypropylene, polyvinylchloride or trifluorochloroethylene;
- the joint is a friction joint resisting pull-out of the end portion of the tube from the head up to substantially the tensile strength of the body of the tube;
- the body of the tube will rupture from destructive internal pressure before the joint will leak or fail;
- said end portion of said tube comprises a first section of substantially uniform diameter and a second section that is radially bent to form a section of progressively changing diameter between an extreme annular end of such end portion and the junction of said first and second sections of the end portion;
- the second section of progressively changing diameter completely occupies a smoothly curving annular groove of the head extending from a lower plane at the junction of the first and second sections of the end portion to an upper plane within said head, the cross section of the annular groove in any radial plane smoothly curving in one direction only with reference to the axis of the tube to provide a smoothly curving annular groove progressively changing in diameter between said lower and upper planes with the diameter at said upper plane being significantly different from the diameter at said lower plane;
- the extreme annular end of said end portion is within the confines of the head, as distinct from opening on any exposed external surface thereof;
- the plastic of the head forms an outer ring around the second section of progressively changing diameter and around said first section of substantially uniform diameter with such outer ring having an external diameter larger than both such sections; and
- the section of progressively changing diameter provides inner and outer surfaces of plastic frictionally engaging corresponding curved plastic surfaces of said head, the first section of substantially uniform diameter providing an outer surface of plastic frictionally engaging the inner surface of said outer ring, all of such frictionally-engaging surfaces making up said friction joint and resisting said pull-out of the end portion of the tube as aforesaid, said joint being further characterized by the absence of any adhesive substance between such frictionally engaging surfaces and by the absence of any substantial fusion of the plastic of the head and the plastic of the tube along such engaging surfaces.

References Cited

UNITED STATES PATENTS

| | | | |
|---|---|---|---|
| 1,620,728 | 3/1927 | Jackson | 220—66 |
| 1,754,496 | 4/1930 | Barker | 222—107 |
| 1,796,721 | 3/1931 | Price et al. | 220—67 |
| 1,921,021 | 8/1933 | Bungay | 222—107 |
| 2,274,258 | 2/1942 | Roselle | 220—67 |
| 2,378,901 | 6/1945 | Amrhein et al. | 264—274 |
| 2,426,289 | 8/1949 | Wallace et al. | 220—67 |
| 2,476,446 | 7/1949 | Lindell | 220—67 |
| 2,752,971 | 7/1956 | Tupper | 150—.5 |
| 2,778,533 | 1/1957 | Savary. | |
| 2,902,934 | 9/1959 | Louis | 220—67 |
| 3,001,673 | 9/1961 | Brown | 222—107 |

THERON E. CONDON, *Primary Examiner.*

JAMES R. GARRETT, *Assistant Examiner.*

U.S. Cl. X.R.

222—107